United States Patent [19]

Cowper

[11] Patent Number: 5,169,267
[45] Date of Patent: Dec. 8, 1992

[54] METHOD OF PUMPING COAL SLURRIES

[76] Inventor: Norman T. Cowper, 1a Noonbinna Crescent, Northbridge, N.S.W. 2063, Australia

[21] Appl. No.: 775,971
[22] PCT Filed: May 2, 1990
[86] PCT No.: PCT/AU90/00176
  § 371 Date: Nov. 4, 1991
  § 102(e) Date: Nov. 4, 1991
[87] PCT Pub. No.: WO90/13500
  PCT Pub. Date: Nov. 15, 1990

[30] Foreign Application Priority Data
  May 3, 1989 [AU] Australia .............. PJ 3992

[51] Int. Cl.$^5$ ............................................. B65G 53/30
[52] U.S. Cl. ......................................... 406/49; 406/197
[58] Field of Search ........................... 406/49, 197, 45

[56] References Cited

U.S. PATENT DOCUMENTS

| | | | |
|---|---|---|---|
| 2,359,325 | 10/1944 | McConnell | 406/197 X |
| 3,637,263 | 1/1972 | Wasp | 406/49 |
| 3,719,397 | 3/1973 | Wasp | 406/197 X |
| 3,881,775 | 5/1975 | McPherson et al. | 406/197 X |
| 4,685,840 | 8/1987 | Wolff | 406/197 X |
| 4,721,420 | 1/1988 | Santhanam et al. | 406/197 |

Primary Examiner—Margaret A. Focarino
Assistant Examiner—James M. Kannofsky
Attorney, Agent, or Firm—Banner, Birch, McKie & Beckett

[57] ABSTRACT

Lump coal is able to be pumped through a pipeline by suspending it in a slurry which is composed of water, fine coal and finely-divided magnetite. At the terminal end of the pipeline, the lump coal is separated from the slurry, which is pumped back for re-use through a return pipeline.

8 Claims, 1 Drawing Sheet

METHOD OF PUMPING COAL SLURRIES

TECHNICAL FIELD

This invention relates to a method of transporting coal and more particularly to an improved method of the transportation of lump coal by suspending it in a slurry and then pumping the resulting mixture through a pipeline.

BACKGROUND ART

The transportation of solids over long distance by slurry pipeline has been applied to a wide range of materials, including coal, iron ore, limestone, phosphate and numerous other minerals. With regards to coal transportation, it has been a tendency in many countries to build power generating stations in the environs of the mine itself and to transmit the resulting output of energy by high voltage transmission lines. As will be appreciated, use of a slurry pipeline would permit the power station to be sited wherever desired. Studies have indicated that, as an alternative to rail transit of coal or to mine mouth generating plants, slurry pipelining is the least expensive option.

However, the conventional slurry pipeline technology has some disadvantages in that preparation of a fine coal/water slurry at the mine site, as well as coal separation at the terminal, impacts the unit transportation cost, setting the lower limit of competitiveness with alternative transportation modes for low annual tonnage and short distance.

The use of lump coal in a coal/water slurry proved to be feasible but was found to require high pumping power and resulted in excessive wear of the pipeline. U.S. Pat. Nos. 2791471, 3073652 and 4685840 provide good examples of prior art coal/water slurry transport.

To eliminate, or at least minimize, rapid settling and so reduce wear and required pumping power it was realized that a slurry vehicle of a density similar to that of the lump coal was highly desirable. Several kinds of slurry composition have been proposed. U.S. Pat. Nos. 3,637,263 and 3,719,397 disclose coal slurry transport using a magnetite/water vehicle; In particular U.S. Pat. No. 3,637,263 teaches the use of two compositions of slurry, coal fines and water on the one hand and coarse coal, magnetite and water on the other hand. U.S. Pat. No. 4,721,420 discloses the transportation of coarse coal particles in a dense liquid carbon dioxide vehicle.

DISCLOSURE OF INVENTION

In contrast to the slurry pumping/flushing/slurry pumping method disclosed in U.S. Pat. No. 3,719,397, through a single pipeline, the present invention uses a slurry pipeline and a return pipeline for the vehicle. Once the advantages of a vehicle return pipeline are contemplated, optimization of the vehicle is to be considered. With the stabilized fine coal vehicle slurries previously considered, the density of the vehicle was less than that of the coal. Under laminar flow conditions there is no turbulence to support the particles but, while there may be some minor lift forces due to the laminar velocity profile, basically the coal is carried along as a so-called "sliding bed". With the reduced relatively density and perhaps some reduction in solid friction coefficient due to lubrication, the pressure gradient is less than with conventional coarse coal but it is still a "sliding bed" situation. This is reflected in the pipe wear rate which, although considerably reduced by the low velocity, has been shown to e still very high compared with conventional fine coal slurry where the particles are supported by turbulence.

It is thus apparent that density differential between the coarse particles being transported and the vehicle slurry is most important. The maximum advantage will occur when the vehicle density equals the average density of the coarse coal. One way of achieving this is to use slurry of finely-divided, high specific gravity solids such as magnetite ($Fe_3O_4$). However, if the vehicle slurry is composed of water and magnetite alone, concentrations of 33 to 38% by weight are required. At such relatively low concentrations the magnetite suspension tends to be unstable and unable to give the required support to the lump coal. In the present invention this is countered by the addition of coal fines which, because of inherent tendency to form a more viscous suspension, stabilizes the magnetite.

Tests leading up to the invention have been undertaken in a 100 millimeter pipe loop with such a vehicle and less than 35 millimeter lump coal. Neutral buoyancy was achieved and the flow at typical velocities was turbulent. Interestingly, the pressure gradient was less than for a conventional fine coal slurry. Pipe wear is very low, neutral buoyancy having been achieved, being largely due to minor variations in density between different coal particles. If the vehicle density equals the average, there would be particles having densities both above and below this value; thus pipe wear will occur at both the top and bottom of the pipe, so giving a more even wear distribution.

At the terminal the lump coal is separated from the inventive vehicle be screening at 0.5 millimeters. The vehicle slurry underflow from the screens is the split into two streams. The major portion is thickened and pumped directly back in the return pipeline. A minor portion is directed to magnetic separators where the magnetite is removed from the fine coal. This fine coal is then thickened and centrifuged and mixed with the lump coal as delivered product. The magnetite is mixed with vehicle slurry for return via the return pipeline. The relative proportion in these two streams depends on the proportion or less than 0.5 millimeter coal in the initial product and the amount of fine coal generated by attrition during transportation. By this means an equilibrium balance is obtained and the fine coal proportion maintained at the desired level.

Although, in accordance with the present invention, a vehicle return pipeline is necessary, both pipelines can be of unlined steel whereas prior art stabilized slurries require pipes with wear-resistant lining. The total pipeline capital cost is lower since the wear resistant lining doubles the pipeline cost and the magnetite/fine coal vehicle return pipeline is of a smaller diameter than the main pipeline.

The disadvantages of the prior art methods are thus overcome, according to the present invention, by the provision of a method of transporting lump coal from a preparation site to a point of use through a main pipeline, comprising the steps of:

preparing, at such preparation site, a suspending vehicle; suspending lump coal in said suspending vehicle; pumping said vehicle and lump coal suspended therein through said main pipeline to the said point of use; separating the lump coal from said suspending vehicle at the said point of use; and pumping the separated suspending vehicle through a vehicle return pipeline back to said preparation site for re-use:

characterized in that said suspending vehicle comprises water, coal fines and finely-divided, high specific gravity solids, the density of said suspending vehicle being substantially the same as that of the lump coal.

Ideally, the finely-divided, high specific gravity solids component is magnetite and, for preference, the particle size of the coal fines and finely-divided, high specific gravity solids, the density of said suspending vehicle being substantially the same as that of the lump coal.

Ideally, the finely-divided, high specific gravity solids component is magnetite and, for preference, the particle size of the coal fines and the finely-divided, high specific gravity solids is less than 500 microns. The ratio of said solids to said coal fines is about 65 to 35 by weight, while the total solids concentration of the suspending vehicle may be 40 to 50% by weight, said total solids comprising both said coal fines and said finely-divided, high specific gravity solids.

BRIEF DESCRIPTION OF THE DRAWING

In order that a better understanding of the invention may be gained, hereinafter will be described a preferred embodiment thereof, by way of example only and with reference to the accompanying drawing, FIG. 1, which is a flow diagram; the legend appended thereto is clear and needs no further explanation.

BEST MODE FOR CARRYING OUT THE INVENTION

Figure 1:
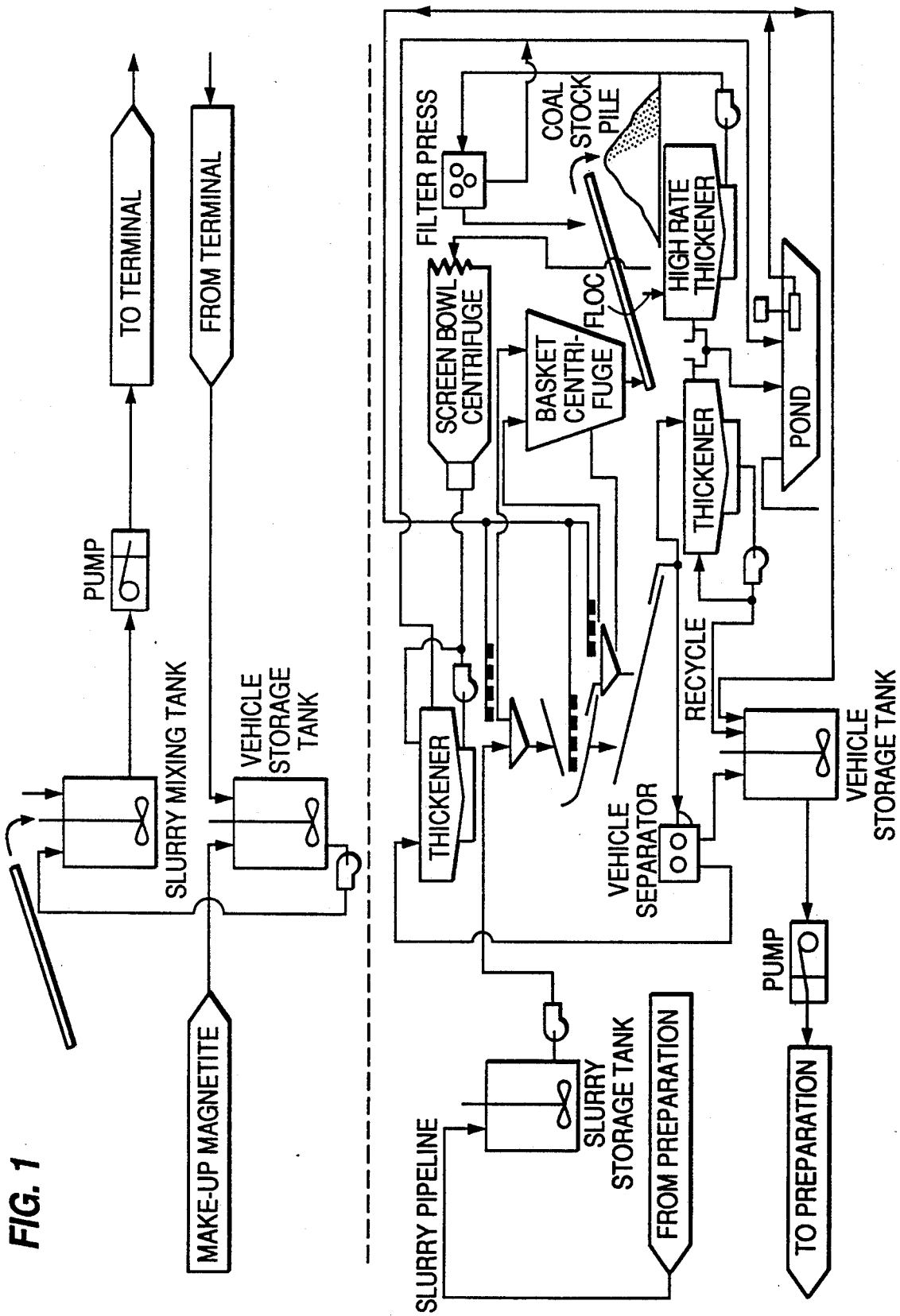

The limitations of the prior art may be overcome by suspending lump coal in the inventive fine particle vehicle of substantially the same settling tendency, so reducing the required pumping power and minimizing pipe wear. Thus the pumping of lump coal over considerable distances now becomes economically viable. At the terminal end of the main pipeline, that is to say, at the point of use, the lump coal is separated from the inventive suspending vehicle which is pumped through a vehicle return pipeline back to the preparation site for further use. As will be appreciated, the method uses no water other than that amount required for the initial filing of both pipelines, a great advantage in arid regions.

The inventive suspending medium is an aqueous mixture of finely-divided, high specific gravity solids—ideally magnetite—and fine coal, usually termed "coal fines", the coal typically having a maximum particle size of about 500 microns and the magnetite having a particle size of less than about 100 microns, perhaps together with a small proportion of chemical additives to adjust the viscosity of the vehicle if required.

Typically, the ratio of the magnetite to the coal fines is about 65:35 by weight but this will, of course, vary depending on the particle size of the magnetite and the fine coal, their physical and chemical properties, and the chemical nature of the water. This inventive suspending vehicle preferably has a solids concentration of about 40 to 50% by weight but, here again, this will vary with the ratio of coal fines to magnetite and with the required vehicle density necessary to suit the lump coal being transported through the main pipeline.

The solids density of lump coal is generally between 1350 and 1450 kilograms per cubic meter. To achieve vehicle densities equal to these using magnetite and the fine coal, their physical and chemical properties, and the chemical nature of the water. This inventive suspending vehicle preferably has a solids concentration of about 40 to 50% by weight but, here again, this will vary with the ratio of coal fines to magnetite and with the required vehicle density necessary to suit the lump coal being transported through the main pipeline.

The solids density of lump coal is generally between 1350 and 1450 kilograms per cubic meter. To achieve vehicle densities equal to these using magnetite along would require magnetite concentrations in water of 33 to 38% by weight. However, at such relatively low concentrations, the magnetite suspension tends to be unstable and be unable to give the required support to the lump coal. In the present invention this is countered by the addition of coal fines which, because of inherent tendency to form a more viscous suspension, stabilizes the magnetite. This addition results in the inventive suspending vehicle being of the required density and stability to support the lump coal and to inhibit its settling tendency, both during pumping and when pumping ceases.

The viscosity of the suspending vehicle is an important parameter. Some fine coals may result in the vehicle's having less than optimum viscosity and in this case small amounts of modifying chemicals may be required to modify the viscosity of the suspending vehicle. Commonly available coagulating or de-coagulating agents are suitable.

During pumping, the lump coal experiences some attrition due largely to the rounding of the initially sharp edges of the particles. These attrition products are mostly ultra-fine coal which results in an increase in the proportion of coal fines in the vehicle. After separating the lump coal at the main pipeline terminal, the suspending vehicle stream is split off to remove the attrition products from the system. Conventional magnetic separators are then used to separate the magnetite from this stream and to return it to the system.

After some period of operation, most of the fine coal in the suspending vehicle will be attrition products. Being mostly ultra-fine these will generally be ideal for forming the inventive suspending vehicle. However, depending on the nature of the attrition products of the particular coal, it may be necessary to add some of the afore-mentioned chemicals to obtain the required slurry properties.

The concept of using a magnetite/coal fines slurry as the suspending vehicle to create a density so as to cause the lumps of coal to be neutrally buoyant in an important feature of the present invention. With magnetite and fine coal in the ratio 65:35 this would typically result in a total vehicle solids concentration of about 50% by weight. For every cubic meter of vehicle slurry, some 0.30 tonnes of coal are added to take the total solids concentration to up to about 65% by weight. At a typical velocity of 2 meters per second such a slurry would have a pressure gradient only about twice that for water. As an example, to transport 500 tonnes per hour of coarse coal (approximately 4 million tonnes per year) this indicates a 450 millimeter diameter pipe with a pressure gradient as low as 120 pascals per meter. Energy consumption is around 0.09 kilowatt-hours per tonne per kilometer. The vehicle return pipeline is ideally about 300 millimeters in diameter with a pressure gradient of perhaps 190 pascals per meter with a similar energy consumption. A typical flow diagram is shown in FIG. 1.

The above-mentioned pressure gradients are very favourable. For example, over a distance of 100 kilometers, instead of the 10 or so pump stations required by the prior art methods, only 1 or 2 are required. At the terminal end of the pipeline the coal is separated from the magnetite-containing suspending vehicle by a simple screening operation. Any contamination of the vehicle with fine coal may be overcome by a constant bleeding of vehicle to a cleaning plant employing magnetic separators as are currently used in heavy media washeries.

INDUSTRIAL APPLICABILITY

Transport of lump coal by buried pipelines has environmental advantages over alternative transport modes but has hitherto involved high pumping power and high pipe wear rates making it generally uneconomic. The method of transporting lump coal according to the present invention is envisaged to offer to the user a much improved system.

From the abovegoing, it will be readily appreciated by those skilled in the art that numerous variations and modifications may be made to the invention without departing from the spirit and scope thereof as set out in the following claims.

I claim:

1. A method of transporting lump coal from a preparation site to a point of use through a main pipeline, comprising the steps of:
   preparing, at such preparation site, a suspending vehicle; suspending said lump coal in said suspending vehicle; pumping said vehicle and said lump coal suspended therein through said main pipeline to said point of use; separating the lump coal from said suspending vehicle at said point of use; and pumping the separated suspending vehicle through a vehicle return pipeline back to said preparation site for re-use;
   characterized in that said suspending vehicle comprises water, coal fines and finely-divided, high specific gravity solids, the density of said suspending vehicle being substantially the same as that of the lump coal.

2. The method as claimed in claim 1, wherein said finely-divided, high specific gravity solids component is magnetite.

3. The method as claimed in claim 1 or claim 2, wherein the particle size of said coal fines and of said finely-divided, high specific gravity solids is less than 500 microns.

4. The method as claimed in claim 1 or claim 2, wherein the ratio of said finely-divided, high specific gravity solids to said coal fines is 65 to 35 by weight.

5. The method as claimed in claim 1 or claim 2, wherein the total solids concentration of said suspending vehicle is from substantially 40% by weight to substantially 50% by weight, said total solids comprising both said coal fines and said finely-divided, high specific gravity solids.

6. The method as claimed in claim 1 or claim 2, wherein said suspending vehicle further comprises a viscosity-modifying agent.

7. The method as claimed in claim 1 or claim 2 wherein, after a period of operation, a major part of said coal fines in said suspending vehicle is constituted by attrition products from the said lump coal.

8. The method as claimed in claim 1 or claim 2, wherein said main pipeline and said vehicle return pipeline are both of unlined steel, the main pipeline having a diameter of 450 millimeters and the vehicle return pipeline having a diameter of 300 millimeters.

* * * * *